Dec. 23, 1924.

P. L. GEER

BRANDING MACHINE

Filed Nov. 13, 1923  2 Sheets-Sheet 1

1,520,235

INVENTOR
Paul L. Geer
BY
M. C. Frank
ATTORNEY

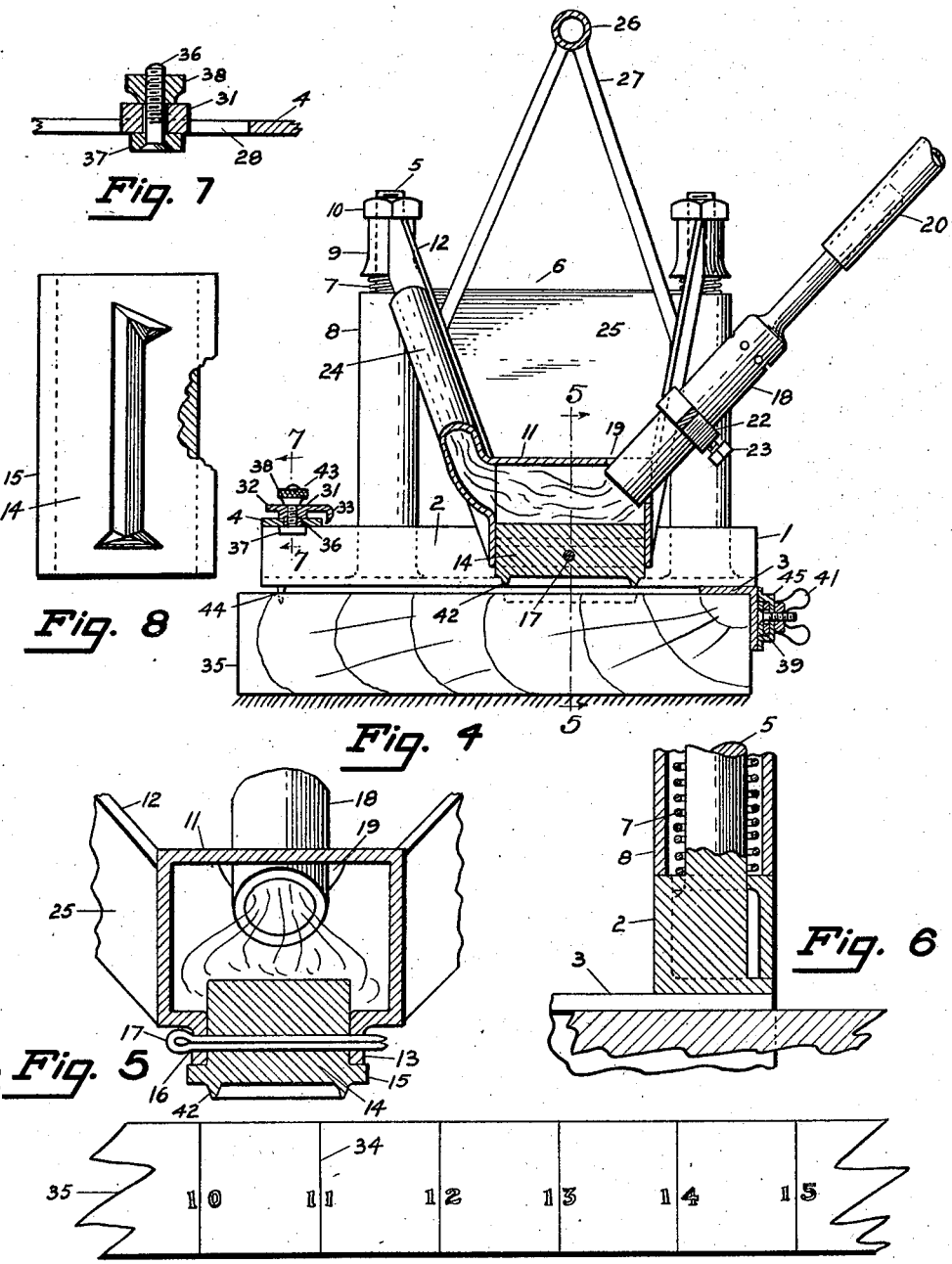

Patented Dec. 23, 1924.

1,520,235

UNITED STATES PATENT OFFICE.

PAUL L. GEER, OF OAKLAND, CALIFORNIA.

BRANDING MACHINE.

Application filed November 13, 1923. Serial No. 674,465.

*To all whom it may concern:*

Be it known that I, PAUL L. GEER, a citizen of the United States, residing at Oakland, in the county of Alameda and State of California, have invented certain new and useful Improvements in Branding Machines, of which the following is a specification.

My invention relates to devices for impressing permanent marks upon objects, and in particular to a self-heating portable branding machine, which is designed primarily for use in branding or burning numerals or other characters upon bleacher seats in large numbers. The machine consists of the novel arrangement of its essential parts and the simple mechanical details of construction incorporated therein, enabling the operator to align the machine, brand the numeral by a simple operation, and move the machine to the next location with great rapidity and accuracy.

An important object of this invention is to construct a portable branding machine of simple construction and of light weight, having a removable self-heating die or branding block.

Another object is to construct a portable machine having adjustable aligning and spacing means, so that it may be instantly located and aligned with relation to the object to be branded and the numerals previously branded.

A further object is to provide a machine having suitable supports, with a movable frame mounted thereon carrying a branding block; and spring-actuated means for normally holding the block retracted in position above the object to be branded.

In addition to the above broader features of the invention, there are certain details of design, whereby compactness, durability of structure, and positiveness and ease of operation are attained, and which details are shown on the accompanying two sheets of drawings illustrating the present embodiment of my invention.

Figure 1 of the said drawings is a plan of my portable branding machine in aligned position and ready for operation upon a plank or the like, such as, a bleacher seat.

Fig. 4 is a vertical section taken upon line 4—4 of Fig. 1.

Fig. 5 is an enlarged transverse section of the heater and branding block taken upon the lines 5—5 of Figs. 2 and 4.

Fig. 6 is an enlarged sectional detail taken upon the line 6—6 of Fig. 2 of the angle-iron frame construction, showing certain parts welded together.

Fig. 7 is an enlarged sectional detail taken upon lines 7—7 of Figs. 2 and 4 showing the movable indicator and spacer.

Fig. 8 is a bottom view of a branding block.

Fig. 9 is a view of a surface that has been spaced and marked, and branded in accordance with my invention.

Figure 1:
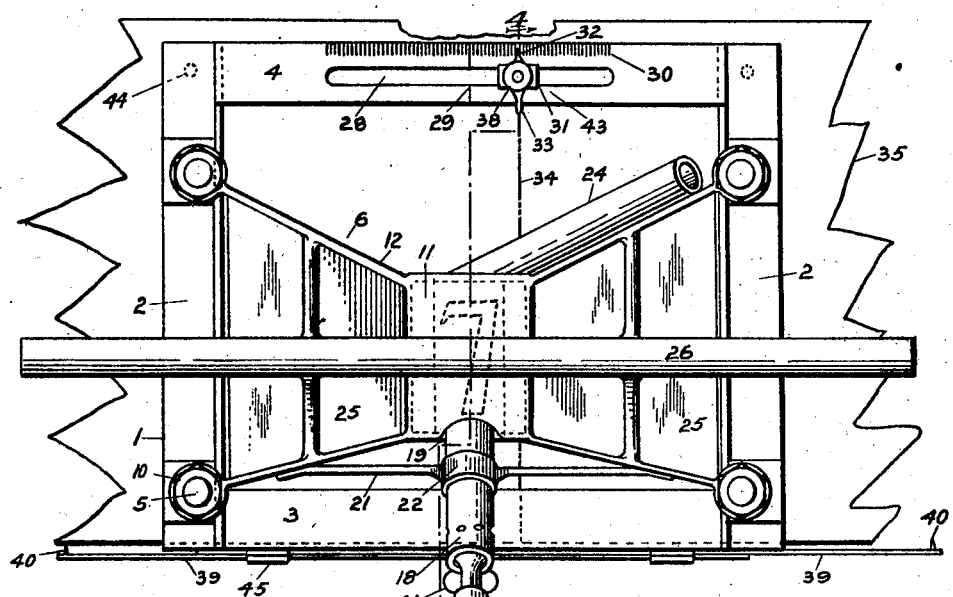

Referring to the drawings and figures thereof: The numeral 1 represents the supporting frame of the device, and preferably consists of angle iron material of light weight, and comprises a rectangular frame having side base supports 2, Fig. 1, connected at their ends by a front gauge bar 3 and a rear spacing bar 4. The side base supports 2 are provided with upwardly extending corner posts 5, which posts form guides for a vertically movable frame 6, carrying the heater and branding block which will be hereinafter more fully described. The said base supports 2, gauge bar 3, spacing bar 4 and corner posts 5, are preferably welded together to form a rigid unit, the supporting frame 1 of the device and which is adapted to support the movable frame 6 thereon.

Over the corner posts 5 are slipped coil springs 7 all of the same length, and about the springs are slipped spacing nipples 8 all of which are also an equal length, but shorter than the coil-spring length.

The said movable frame 6 includes corner bearing members 9 in the form of open tubes having a wide base, and which are adapted to slip over the posts 5.

The members normally bear on the coil springs 7, and in action upon the tops of the nipples 8. Above the members 9 are stop nuts 10 snugly threaded on the ends of the posts 5.

A rectangular housing 11 is supported centrally of the base supports 2 near the gauge bar 3, by brace arms 12; said arms are welded to the bearing members 9 and to the corners of the rectangular housing 11 to rigidly support said housing, and which latter forms a part of the movable frame 6. The top of the housing is closed, Fig. 5, and the bottom open and flanges 13 extend downwardly to form an opening extending from the rear wall to the front wall of said housing. The opening is of sufficient size to admit a branding block 14. The latter may be rectangular in cross section and has longitudinal flanges 15 formed integral therewith, and which abut against the edges of the flanges 13 for seating the block in the housing 11, thus closing the opening. The flanges 13 and block 14 have a hole drilled therethrough as at 16, Fig. 5, to receive a cotter pin 17 to retain the block in position in the housing 11.

A Bunsen burner 18 extends into the housing 11, Figs. 1 and 4, through an opening 19 formed in the front wall thereof at an angle with relation to the branding block 14. The burner has a flexible supply pipe 20 connected thereto from a source of fuel supply (not shown). Said Bunsen burner is centrally located between the brace arms 12 by a bracket 21 having a centrally located collar 22 with set screw 23 adapted to secure said burner in said collar.

To the rear wall of the housing 11 a vent pipe 24 is welded and directed angularly away from the operator.

Deflector plates 25, Fig. 1, are welded to the underside of the brace arms 12 to deflect the heat waves from the hands of the operator when the branding block is in operation.

A tubular handle 26 is welded to the movable frame 6 by rods 27, and is suitably positioned with respect to the machine to be conveniently gripped by the operator in the manipulation of the movable frame. The handle is also the carrying medium for the machine.

The spacing bar 4 is provided with an elongated slot 28, Fig. 1, extending equidistant upon either side of the center line 29 of the machine; the upper face of the said bar is provided with a series of graduated marks 30, spaced apart one-sixteenth of an inch and said marks extend from one end of the slot to the other.

In the slot rides an indicator 43, which consists of a shouldered member 31 adapted to fit in the slot; said member has indicator fingers 32 and 33 extending in opposite directions; with finger 32 pointing to the graduated marks 30 and finger 33 turned downwardly to locate the machine on the reference line 34 on the plank or seat 35. Clamp screw 36 extends through an opening in the member and has a washer 37 at the lower end thereof; the head of the screw engages the washer, and a knurled nut 38 at the other end of the screw clamps the indicator where desired.

The gauge bar 3, preferably of angle iron, has a downwardly extending leg adapted to fit against the side edge of the plank to align the machine with respect to the reference line on the plank, or any numerals already branded thereon.

The under faces of the angle-iron base supports 2 may be provided with prick points 44, for engagement with the upper face of the plank to hold the leg of the gauge bar 3 in alignment against the edge of said plank.

Reference-line spacing mechanism is attached to the outer face of the leg of the gauge bar 3, and comprises a pair of bars 39 held slidably together by brackets 45. Said bars have prick points 40 at their outer ends respectively for engagement with the edge of the said plank, but remain normally out of engagement therewith. The said leg is provided with a screw extending outwardly through a slot in the bars and has a winged nut 41 thereon to clamp said bars together in spaced relation when said nut is tightened.

Figure 3:
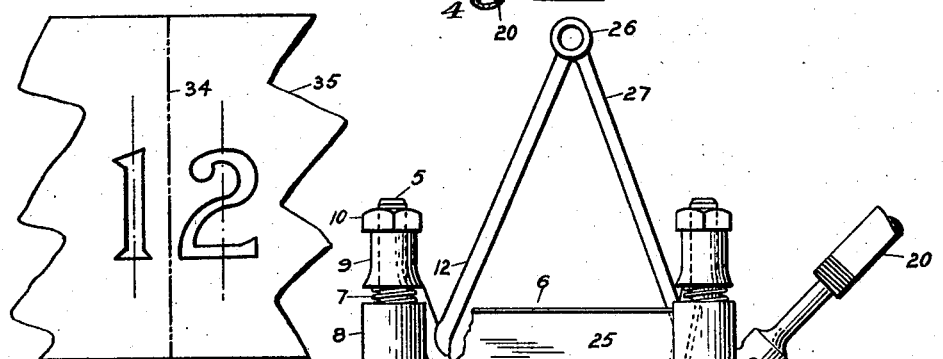
Fig. 3 is a fragmentary portion of planking showing the numerals as they appear after the branding operation; the latter are spaced apart in proper relation to the reference line previously made on the plank.

The operation of branding is as follows: Referring to Fig. 3 it will be noted that the center lines of the numerals "1" and "2" are spaced apart different distances from the reference line 34 on the plank 35; in this instance the center line of the numeral "1" is spaced seven-sixteenths of an inch from the line 34 and the center line of numeral "2" is spaced thirteen-sixteenths of an inch from said line. It is therefore desirable to run off all the numerals spaced seven-sixteenths of an inch in one operation, before changing the indicator to locate the machine thirteen-sixteenths of an inch off center for the next set of numerals.

If the operator is running the numerals from "1" to "9" only, he sets the indicator 43 directly on the center line 29 of the machine, and the branding block 14 is therefore in alignment with the reference line 34 on the plank, and the said numerals will be branded directly on said line 34.

As a general rule the reference lines 34 are scored upon the plank 35 previous to the branding operation, but in the event that they are not, I have provided the previously mention spacing mechanism on the machine for that purpose. For example, if reference lines are desired 18 inches apart, and the operator wishes to space the machine by the use of my spacing mechanism, he slides the bars 39, in front of the gauge bare 3, apart until 18 inches is measured between the prick-points 40, that is, each point will be 9 inches from the center line 29 of the machine. The wing nut 41 may then be tightened to hold the said bars set, and the prick points may successively engage each prick-point hole as the machine advances each 18 inches. At each mark made by the point a reference line may be scored.

Figure 2:
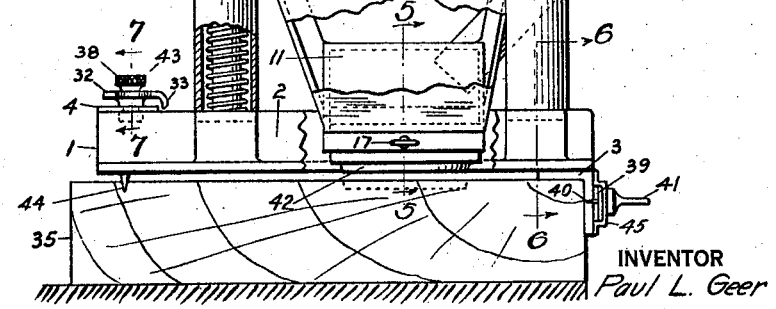
Fig. 2 is a side elevation with portions broken away to show parts behind more clearly.

Referring to Figs. 2 and 4, the branding block 14 is shown in its normal position above the plank 35. In Fig. 4 the burner is shown in position in the heater-housing projecting a flame on the branding block to produce the required degree of heat for branding, a vent to the heater being formed by the outlet pipe 24.

The projecting numeral 42 on the under face of said branding block is gothic in character and V-shaped in cross section, so that it will readily enter the wood and be easily withdrawn therefrom when the handle 26 is released by the operator.

When the machine with its set indicator 43, is placed in the position shown in Fig. 1, directly over the reference line 34 on the plank 35, the handle 26 may then be pressed downwardly by the operator and the frame 6 integral therewith compresses the coil springs 7. The said movement of the frame is limited by the bearing members 9 contacting the spacing nipples 8. The extent of this movement governs the depth of the numeral 42 into the plank. The pressure on the handle is applied just long enough t' brand and clearly define the numeral in the wood. On releasing the pressure on the handle 26, the movable frame 6 returns to normal position by the counter-pressure of said springs 7, thereby carrying the die block out of engagement with the plank. The machine may then be moved to the next reference line on the plank and another numeral may be branded in the same manner.

When it is desired to change the numeral the die block is withdrawn from the housing by removing the cotter pin, and another die block inserted and heated to the proper degree and the operation continued, setting the indicator with respect to the reference line or numeral previously branded, or both. The fuel for the burner 18 may be a gas or oil from a portable tank or other source, or the source of heat may be otherwise. The flexible connection between said burner and container may be of any desired length to enable the operator to work a considerable distance away, without moving said tank or container as long as within range-length of said connector medium.

Ordinarily bleacher-seat construction consists of planks laid upon a concrete base, and it is this construction that I have reference to and have shown in the drawings, but it is to be understood that the plank or other object may be of any form that my machine may suitably impress permanent marks thereon. It is also to be understood that the die block may have more than one numeral thereon or any other characters.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made, when desired, as fall within the scope of the appended claims.

Having thus described my invention, what I claim as new and desire to secure by Letters Patent of the United States, is the following:

1. A portable branding machine comprising, a supporting frame and a movable frame thereon, means for limiting the movement of said movable frame, a branding block mounted in said movable frame, and adapted to operate through and below said supporting frame, and means for spacing and aligning said branding block with relation to the object to be branded.

2. A portable branding machine comprising, a supporting frame adapted to rest on the object to be branded, a movable frame adapted to be reciprocated in said supporting frame and carrying a branding block operable through and below said supporting frame, means for heating said branding block, and means for limiting the reciprocal movement of said movable frame and branding block.

3. A portable branding machine comprising, a supporting frame adapted to rest on the object to be branded, a spring-actuated frame adapted to reciprocate in said supporting frame by manual effort, a die block in said reciprocating frame adapted to operate through and below said supporting frame; and means for spacing and aligning said die block with relation to the object to be branded.

4. A portable branding machine comprising, a supporting frame adapted to rest on the object to be branded, a vertically movable frame mounted in said supporting frame and provided with a branding iron adapted to operate through and below said supporting frame, a heater-housing carried by said movable frame, and means for projecting a flame into said housing to heat said branding block.

5. A portable branding machine comprising, a supporting frame adapted to rest on the object to be branded, a vertically movable frame mounted in said supporting frame, a branding block mounted in said movable frame and adapted to operate below said supporting frame, spring-actuated means for normally holding said branding block in retracted position, and means adapted for normally operating said movable frame to bring said branding block into engagement with the object to be branded.

6. A portable branding machine comprising, a supporting frame adapted to rest on the object to be branded and provided with spacing and aligning means, a movable frame adapted to have a branding block mounted therein and operable through and below said supporting frame, means for spacing and aligning said frames and branding block with relation to the object to be branded, and means for holding said frames in spaced and aligned position with respect to each other.

7. A portable branding machine comprising, a supporting frame adapted to rest on the object to be branded, a spring-actuated movable frame mounted in said supporting frame, a heater-housing in said movable frame and adapted to receive a die block, means for projecting a flame into said housing to heat said die block; the said spring-actuated frame normally holding said die block out of engagement with the object to be branded, and said latter frame having handle means adapted for manually moving said die block into engagement with the object to be branded.

8. A portable branding machine comprising, a supporting frame adapted to rest on the surface to be branded, a spring-actuated movable frame mounted in said supporting frame, a heater-housing in said movable frame and adapted to receive a die block, means for projecting a flame into said housing to heat said die block, and means for spacing and aligning said movable frame and die block; the said spring-actuated frame normally holding said die block out of engagement with the object to be branded, and said latter frame having handle means adapted for manually moving said die block into engagement with the object to be branded.

9. A portable branding machine having a supporting frame of angle iron construction adapted to rest on the object to be branded, the parts thereof being welded together as a unit; a second frame of similar construction welded together as a unit and movably mounted in said supporting frame and having a housing adapted to receive a die block, spring means for holding said movable frame in limiting position, manually operated means for moving said die block and movable frame against the pressure of said spring means and into engagement with the object to be branded.

10. A portable branding machine comprising, a supporting frame adapted to rest on the object to be branded, a spring-actuated and vertically-movable frame mounted in the supporting frame, a die block mounted in said movable frame and held in retracted position by said spring-actuated means, spacing means for locating said frames and die block centrally of the object to be branded, aligning means for holding said frames so located, and means for manually reciprocating the movable frame and die block to engage said object to be branded.

In testimony whereof I affix my signature.

PAUL L. GEER.